(Model.)

M. HEMLER.
COUPLING DEVICE FOR SAFE SPINDLES.

No. 320,250. Patented June 16, 1885.

Attest.
Christian B. Rapp
Casper Miles.

Inventor.
Michael Hemler
By Geo. Murray
Atty

UNITED STATES PATENT OFFICE.

MICHAEL HEMLER, OF CINCINNATI, OHIO, ASSIGNOR TO MOSLER SAFE AND LOCK COMPANY.

COUPLING DEVICE FOR SAFE-SPINDLES.

SPECIFICATION forming part of Letters Patent No. 320,250, dated June 16, 1885.

Application filed December 3, 1884. (Model.)

*To all whom it may concern:*

Be it known that I, MICHAEL HEMLER, a citizen of the United States, and a resident of Cincinnati, in the county of Hamilton and State of Ohio, have invented certain new and useful Improvements in Coupling Devices for Safe-Spindles, of which the following is a specification.

The object of my invention is a means of disconnecting the bolt-spindle of a safe or bank-vault from the train-bolts when the safe is locked, and to couple the train-bolts with the spindle when the bolt of the combination-lock is retracted, so that the train-bolts may be shot in either direction when the bolt of the combination-lock is retracted, and when the bolt of the combination-lock is protruded it is uncoupled.

With this object in view my invention consists in a sliding coupling device actuated by the bolt of the combination-lock to couple and uncouple the train-bolt spindle.

I will first describe my invention in connection with the accompanying drawings, and then particularly point out and refer to its novel features in the claims.

Figure 1:
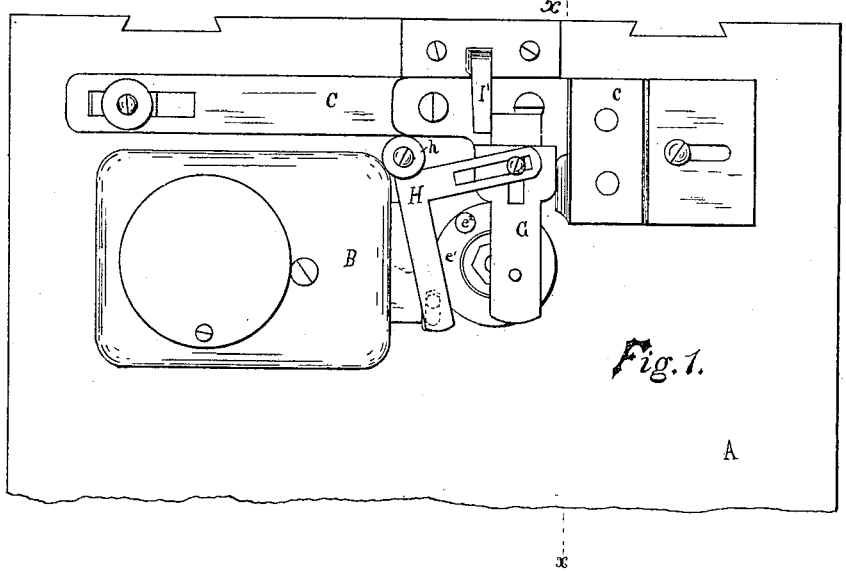
Figure 2:
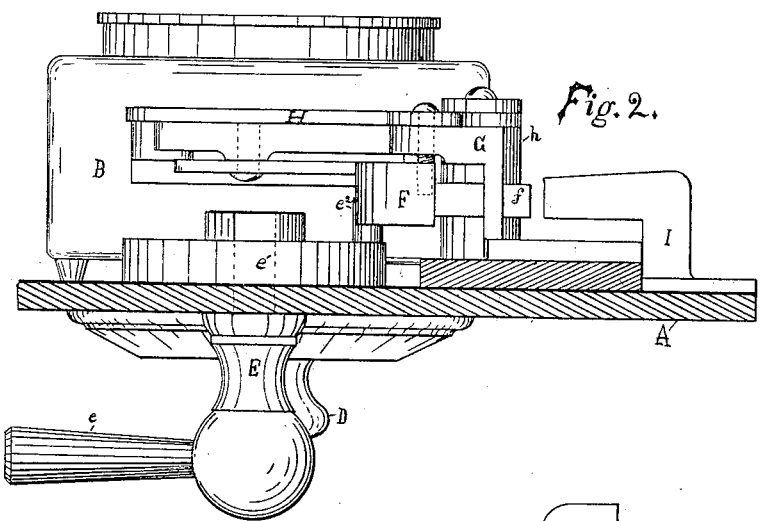
Figures 3, 4:
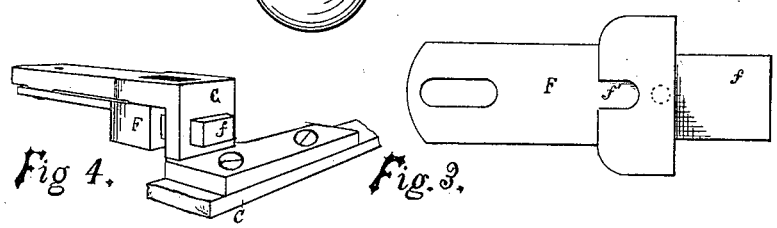

Figure 1 is an inside plan view of a portion of a safe-door provided with my improvements. Fig. 2 is a vertical section of the same, taken through line $x$ $x$ of Fig. 1. Fig. 3 is a detached plan view of the vertical sliding coupling device. Fig. 4 is a perspective view of the angle-piece, which is secured to the slide of the bolt-work with the coupling-slide, Fig. 3, attached.

Throughout the various views like parts are indicated by similar reference letters wherever they occur. The safe-door A has the customary combination-lock, B, secured upon the inside, and C represents the sliding bar which actuates the train-bolts ordinarily employed to secure the safe-door.

D represents the knob of the arbor which operates the combination-tumblers of the lock B, and E is the spindle by which the train-bolts of the safe are operated by the customary handle, $e$.

Secured upon the inner end of the spindle E is a wheel, $e'$, which has a pin, $e^2$, projecting inwardly from it to engage the notch in the sliding coupling device F. The coupling device F is attached to the angle-piece G, Fig. 4, (which is secured upon the bolt-bar C,) by a screw passing through a slot in its lower end into the piece G, and another screw passing through a slot in the piece G into the upper portion of the coupling device F, in connection with the opening in the horizontal portion of the piece G, through which the bolt $f$ of the piece F passes to secure the two parts F and G together.

H is a bell-crank secured upon a stud, $h$, which projects inwardly from the door A. One arm of the bell-crank is connected to the bolt of the combination-lock B by a screw which is seated in said arm of the bell-crank, and engages a vertical slot of the combination-lock, and the opposite arm is slotted to receive a screw which passes through the vertical slot in the piece G and into the coupling device F. It will thus be seen that when the bolt of the combination-lock is protruded, as shown in Fig. 1, the slide F will be carried up and its notch $f'$ thrown out of the path of the crank-pin $e^2$, projecting from the wheel $e$, which is secured upon the lock-spindle. In this position the lock-spindle may be turned freely, as it is wholly disconnected from the train-bolt mechanism.

Secured above the sliding bar C is a plate, I, which has a dog or stud, I', projecting from it over bolt-bar C. When the safe is locked, the bolt $f$ of the slide F passes up alongside of this stud I' and dogs the bolt-work, so that it would be impossible to force the bolt back.

When the bolt of the combination-lock is retracted, as shown in Fig. 2, the slide F is thrown down, throwing its bolt $f$ out of engagement with the stud I' and bringing its notch $f'$ in position to engage the pin $e^2$, thus coupling the spindle with the bolt-work. The pin $e^2$ being in the same vertical plane with the handle $e$, the notch $f'$ will of course slide into engagement with it when the bolt of lock B is retracted.

I have not deemed it necessary to show the train-bolts, as their construction, arrangement, and connection with the sliding bar C are well understood. The spindle-arbor, its wheel $e$, and crank-pin $e^2$ are substantially the same as those now in common use, which are permanently engaged with the slide C, which operates the train-bolt. I have simply added the sliding coupling device F and its attachments to the common form of lock-and-bolt work usually employed. By this simple means I am enabled to couple and uncouple the lock-spindle, as before described.

What I claim as new, and desire to secure by Letters Patent, is—

1. In combination with the train-bolt of a safe and the bolt of a combination-lock, the angle-piece G, secured to the slide of the train-bolt, and the vertical sliding coupling device F, and the crank-lever H, said lever having one arm connected to the sliding bolt F, and the other arm connected to the bolt of the combination-lock, the said coupling device F having a notch, $f'$, to be engaged with and disengaged from the crank-pin of the bolt-spindle by retracting and protruding the bolt of the combination-lock, substantially as specified.

2. The combination, substantially as specified, of the sliding bar C, angle-piece G, secured thereon, and the coupling device F, secured to slide vertically on said angle-piece G, with the spindle E, bell-crank H, and lock B.

MICHAEL HEMLER.

Witnesses:
MAX S. GOLDSMITH,
J. GRAESER.